United States Patent
Buga

(10) Patent No.: US 10,390,104 B2
(45) Date of Patent: Aug. 20, 2019

(54) CONTEXT ADVERTISING BASED ON VIEWER'S STRESS/RELAXATION LEVEL

(71) Applicant: Dish Ukraine L.L.C., Kharkov (UA)

(72) Inventor: Yaroslav Buga, Kharkov (UA)

(73) Assignee: DISH Ukraine L.L.C., Kharkov (UA)

( * ) Notice: Subject to any disclaimer, the term of this patent is extended or adjusted under 35 U.S.C. 154(b) by 0 days.

(21) Appl. No.: 15/569,894

(22) PCT Filed: Apr. 29, 2015

(86) PCT No.: PCT/UA2015/000040
§ 371 (c)(1),
(2) Date: Oct. 27, 2017

(87) PCT Pub. No.: WO2016/175731
PCT Pub. Date: Nov. 3, 2016

(65) Prior Publication Data
US 2018/0115808 A1    Apr. 26, 2018

(51) Int. Cl.
*H04H 60/33* (2008.01)
*H04N 7/10* (2006.01)
*H04N 7/025* (2006.01)
*H04N 21/81* (2011.01)
*G06Q 30/02* (2012.01)
*H04N 21/442* (2011.01)

(52) U.S. Cl.
CPC ....... *H04N 21/812* (2013.01); *G06Q 30/0251* (2013.01); *G06Q 30/0269* (2013.01); *H04N 21/44213* (2013.01)

(58) Field of Classification Search
CPC ......... H04N 21/42201; H04N 21/4331; H04N 21/44213; H04N 21/45; H04N 21/4532
See application file for complete search history.

(56) References Cited

U.S. PATENT DOCUMENTS

| 2012/0072936 A1* | 3/2012 | Small ..................... G06Q 30/00 725/10 |
| 2012/0158504 A1* | 6/2012 | Kumar ............... G06Q 30/0255 705/14.53 |
| 2012/0197737 A1* | 8/2012 | LeBoeuf ................ G16H 50/30 705/14.66 |

(Continued)

FOREIGN PATENT DOCUMENTS

WO    2016/175731 A1    11/2016

OTHER PUBLICATIONS

International Search Report and Written Opinion for PCT/UA2015/000040 dated Oct. 21, 2015, 8 pages.

*Primary Examiner* — Kyu Chae
(74) *Attorney, Agent, or Firm* — Kilpatrick Townsend & Stockton LLP

(57) ABSTRACT

Techniques, systems, methods and devices, such as television receivers, are described that are useful for displaying contextual and/or personalized video advertisements to viewers that take into consideration the viewers' personal attributes, such as biological characteristics or mental characteristics, including stress levels. Optionally, this is achieved by use of one or more sensors, including thermal sensors, electrical sensors, optical sensors, acoustic sensors, biosensors, etc., to determine a stress level of the viewer and then matching the viewer's stress level to an appropriately tagged advertisement.

12 Claims, 8 Drawing Sheets

(56) References Cited

U.S. PATENT DOCUMENTS

| | | | |
|---|---|---|---|
| 2012/0304206 A1* | 11/2012 | Roberts | H04H 60/33 |
| | | | 725/12 |
| 2013/0080260 A1* | 3/2013 | French | H04H 60/33 |
| | | | 705/14.66 |
| 2013/0243245 A1* | 9/2013 | Bill | G06F 17/30743 |
| | | | 382/103 |
| 2014/0047465 A1 | 2/2014 | Zaslavsky et al. | |
| 2016/0182955 A1* | 6/2016 | Klappert | H04N 21/4668 |
| | | | 725/14 |

* cited by examiner

CONTEXT ADVERTISING BASED ON VIEWER'S STRESS/RELAXATION LEVEL

CROSS-REFERENCE TO RELATED APPLICATIONS

This application is a U.S. National Stage of PCT International Application No. PCT/UA2015/000040, filed on Apr. 29, 2015, entitled "CONTEXT ADVERTISING BASED ON VIEWER'S STRESS/RELAXATION LEVEL," which is hereby incorporated by reference in its entirety.

BACKGROUND

Contextual advertising has commonly been implemented for web-based content, such as websites, where targeted advertisements are shown to a specific user or for specific products based on the content shown on the website. The context for the advertisement may greatly impact the success of the advertisement. For example, it is thought that a user may find interest in an advertised product or service that is related to a product or service that the user has previously expressed interest in or purchased, and so the advertisements may be shown to the user based on the user's historical or usage characteristics. Additionally, profiles of users may be developed that indicate a user's personal characteristics, such as age, gender, income, etc., and this information may be used for successfully advertising products or services that are marketed for people with similar characteristics. Further, principles of contextual advertising suggest that advertisements shown to a user that are associated with the content of a website or article being viewed by the user are more effective than advertisements for unrelated products or services.

SUMMARY

Although contextual advertising has achieved success in web-based environments, limited success has been achieved in other printed environments and video environments. For these other environments, it is more difficult to track users on an individual basis and show individualized advertisements to users. For example, although a magazine may know information about the subscriber, such as age, gender, interests, etc., individualized print runs of a magazine for different individual subscribers is cost prohibitive. Similarly, for live television, providing different commercials to different individual subscribers may be difficult.

In various aspects, the present invention, however, provides techniques, systems, methods and devices, such as television receivers, for displaying contextual and/or personalized video advertisements to television viewers that take into consideration the viewers' personal attributes, such as biological characteristics or mental characteristics, including stress levels. Optionally, this is achieved by use of one or more sensors, including thermal sensors, electrical sensors, optical sensors, acoustic sensors, biosensors, etc., to determine a stress level of the viewer and then matching the viewer's stress level to an appropriate advertisement. The use of sensors in this way is advantageous, in various embodiments, as the sensors can provide real-time data regarding the viewer's stress levels, allowing advertisements to be tailored on a moment-by-moment basis and/or allowing advertisements to be selected based on changes to the viewer's stress level in response to previously shown advertisements.

For example, the present invention allows advertising a product or service that might be persuasive to the viewer depending on the viewer's stress level or change in stress level. In embodiments, the systems, methods and devices described allow for television service providers to provide targeted advertisements to television viewers on an individualized basis by developing a viewer profile including viewer attributes, such as mental or other biological characteristics, and selecting advertisements from an advertisement database. In embodiments, the advertisements included in the advertisement database are tagged and/or categorized with target viewer attributes or target viewer attribute ranges, such that the advertisements can be selected appropriately for the viewer.

Aspects of the invention optionally employ characteristics of on-demand television, where individual content streams are provided to a viewer's television receiver, as opposed to a linear content stream that is provided simultaneously to multiple subscribers. Optionally, the primary television program being viewed can have individualized contextual advertisement content streams inserted at appropriate breaks between program segments. In some embodiments, the primary television program have contextual advertisements hard coded within the program content stream and, optionally, a television receiver can switch between different hard coded program content streams, such as at a commercial break, upon detecting a change in viewer stress level.

In one aspect, provided are methods for displaying contextual advertisements, for example based on a viewer's stress level. Various methods of this aspect provide for real-time customization of advertisements shown by detecting viewer attributes, such as biological and/or mental characteristics, or changes in the viewer attributes. For example, in some embodiments, customization occurs as advertisements are shown and/or within a short time period after advertisements are shown, such as within 5 seconds, within 3 seconds, within 1 second or within 0.5 seconds. In one embodiment, sensors are used to provide data in real-time that allows identification or tracking of viewer characteristics so that appropriately selected advertisements can be shown to the viewer.

A specific method of this aspect comprises receiving a first content stream, generating a first output signal for displaying the first content stream, determining viewer attribute information, identifying a second content stream, such as by using the viewer attribute information, receiving the second content stream and generating a second output signal for displaying the second content stream. In various embodiments, the viewer attribute information characterizes a biological characteristic or a mental characteristic of a viewer. In embodiments, the viewer attribute information characterizes or is a stress or relaxation level of the viewer. Optionally, the display of the first content stream can be continued after the end of the second content stream. Optionally, methods of this aspect further comprise identifying updated viewer attribute information, such as updated viewer attribute information that characterizes an updated biological characteristic or updated mental characteristic of the viewer. Optionally, methods of this aspect further comprise identifying a third content stream, such as by using the updated viewer attribute information, receiving the third content stream, and generating a third output signal for displaying the third content stream. In this way, different content streams can be displayed to the viewer as the viewer's attribute information changes. In various embodiments, the first content stream is a video program and the second content stream, and optionally the third content stream, is an advertisement.

Optionally, methods of this aspect are useful for displaying advertisements based on a number of biological or mental characteristics. For example, in embodiments, the biological characteristic of the viewer is a heart rate, a temperature, a blood pressure, a respiratory rate, a blood glucose level, a blood oxygen level, a gender, an age, a skin conductivity, a perspiration level, electroencephalography, electromyography, eye-tracking, heart rate variability, and any combination of these. In embodiments, for example, the mental characteristic of the viewer is a stress level, a relaxation or anxiety level, an arousal or boredom level, a happiness or sadness level, a fatigue level, an anger level, a disgust level, a meditation state, a concentration state, etc.

In various embodiments, determining viewer attribute information includes receiving information from one or more sensors. For example, any of a variety of sensors are useful for obtaining information about the viewer that can contribute to a determination of the viewer attribute. For example, various health monitors are useful with the methods, systems, devices, etc., described herein. For example, useful health monitors include, but are not limited to heart rate monitors, blood glucose monitors, blood pressure monitors, body or skin temperature monitors, pulse oximeters. Other types of optical and/or electrical sensors are also useful. For example, thermal imaging cameras, range cameras, video cameras and still image cameras, such as for facial expression analysis or facial characteristic analysis, motion detectors, such as for pattern recognition, gesture, or body language determination, microphones or other audio sensors, such as for voice stress level analysis, and the like, are useful with the various aspects described herein.

Optionally, the viewer attribute information is computed using information from one or more sensors. Optionally, determining viewer attribute information includes determining the mental characteristic of the viewer, for example in real-time, such as by using information from one or more sensors. In some embodiments, determining viewer attribute information includes determining the biological characteristic of the viewer, for example in real-time, such as by using information from one or more sensors. Optionally, identifying the second content stream includes transmitting the viewer attribute information to a remote server. In embodiments, the viewer attribute information is computed at a remote location, such as at or by a service provider or facilities thereof. Optionally, sensor data is transmitted to a service provider, such as for use in a viewer profile or for use in computing viewer attribute information. In a specific embodiment, determining viewer attribute information includes receiving computed viewer attribute information.

In various embodiments, one or more sensors are associated with a television receiver, such as one or more sensors in data communication with the television receiver or a processor or other component thereof, such as by way of a wire or wireless network. The sensors associated with the television receiver are optionally implemented as a component of the television receiver, such as one or more biometric sensors or cameras. Other sensors are optionally implemented as viewer worn sensors that communicate with the television receiver or a network. In some embodiments, sensors are positioned on or within other devices, such as a television receiver or a display device or a peripheral connected wired or wirelessly to a television receiver or a display device. Optionally, sensors may be stand-alone devices, such as digital imaging cameras, motion sensors, etc. Useful sensors include, but are not limited to, motion sensors, capacitive sensors, electrical sensors, optical sensors, cameras, biometric sensors, microphones, heart rate sensors, fingerprint readers, facial recognition cameras, eye recognition cameras and the like.

Optionally, a sensor comprises a data transceiver. Inclusion of a data transceiver is advantageous, for example, to allow configuration data to be transmitted to and/or received by a television receiver or an associated device, such as a display device, or a service provider. A variety of data transceivers are useful with various aspects. For example, a data transceiver is optionally wired or wireless. Useful wireless data transceivers include infrared transceivers, optical transceivers and radio frequency transceivers, such as Bluetooth or Wi-Fi transceivers. In this way, data can be exchanged between devices, sensors, computers, internet servers, television receivers, etc.

Optionally, determining viewer attribute information includes receiving information from a stored viewer profile. In various embodiments, the viewer attribute information may be stored or retrieved from a viewer profile. Optionally, determining viewer attribute information includes receiving input corresponding to a determination of the viewer attribute information. For example, the viewer may provide input, such as by way of a remote control or other input device, to manually select or enter a viewer attribute, such as a stress level or other mental or biological characteristic.

In embodiments, one or more content stream include a content attribute. Optionally, content attributes are useful for tagging, categorizing or otherwise classifying a content stream as suitable or associated with a particular viewer attribute or range of viewer attributes, such as a stress level or range of stress levels. For example, in an embodiment, the second content stream includes a content attribute. Optionally, identifying the second content stream includes using the content attribute to identify viewer biological characteristics or viewer mental characteristics of an intended audience for the second content stream. In embodiments, identifying the second content stream includes comparing the viewer attribute information with content attributes for one or more content streams. In some embodiments, identifying the second content stream includes requesting a content stream from a database associated with the viewer attribute information. In embodiments, identifying the second content stream includes selecting the second content stream from a plurality of content streams based on the viewer attribute information. Optionally, identifying the second content stream includes selecting the second content stream based on the comparison. In a specific embodiment, identifying the second content stream includes matching the viewer attribute information with a content attribute for the second content stream.

In embodiments, a threshold level is used for matching or selecting a content attributes to viewer attribute information. In a specific embodiment, identifying the second content stream includes identifying a threshold content attribute and identifying the second content stream using the threshold content attribute. For example, in various embodiments, the threshold level is set by a viewer, an advertiser, or a service provider. Optionally, the threshold level is set according to a time of date and/or day of week. Optionally, identifying the second content stream includes using a current date or time. For example, the second content stream selected at one time of day for a particular stress level may be different from the second content stream selected at another time of day for the same particular stress level.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

As technology advances, the ability to gather data about people is becoming easier. With the growing accumulation of data, contextual advertising using the accumulated data is becoming more advantageous, for example, offering the ability to more effectively communicate with consumers about products and services that may be of interest to the consumers.

For example, wearable technology has recently become more commonplace and, with it, the ability to monitor biological or mental characteristics, such as by observing physiological attributes of and correlating those attributes with a mental character or biological character. Various aspects of the invention utilize one or more sensors to aid with the determination of a viewer's mental characteristics and/or biological characteristics, such as to allow for appropriate selection of advertising content based on mental and/or biological context to be presented to the viewer. In this way, advertisers can more effectively advertise their products and services and consumers can more effectively learn about products and services that are potentially of interest to the consumer.

Figure 1:
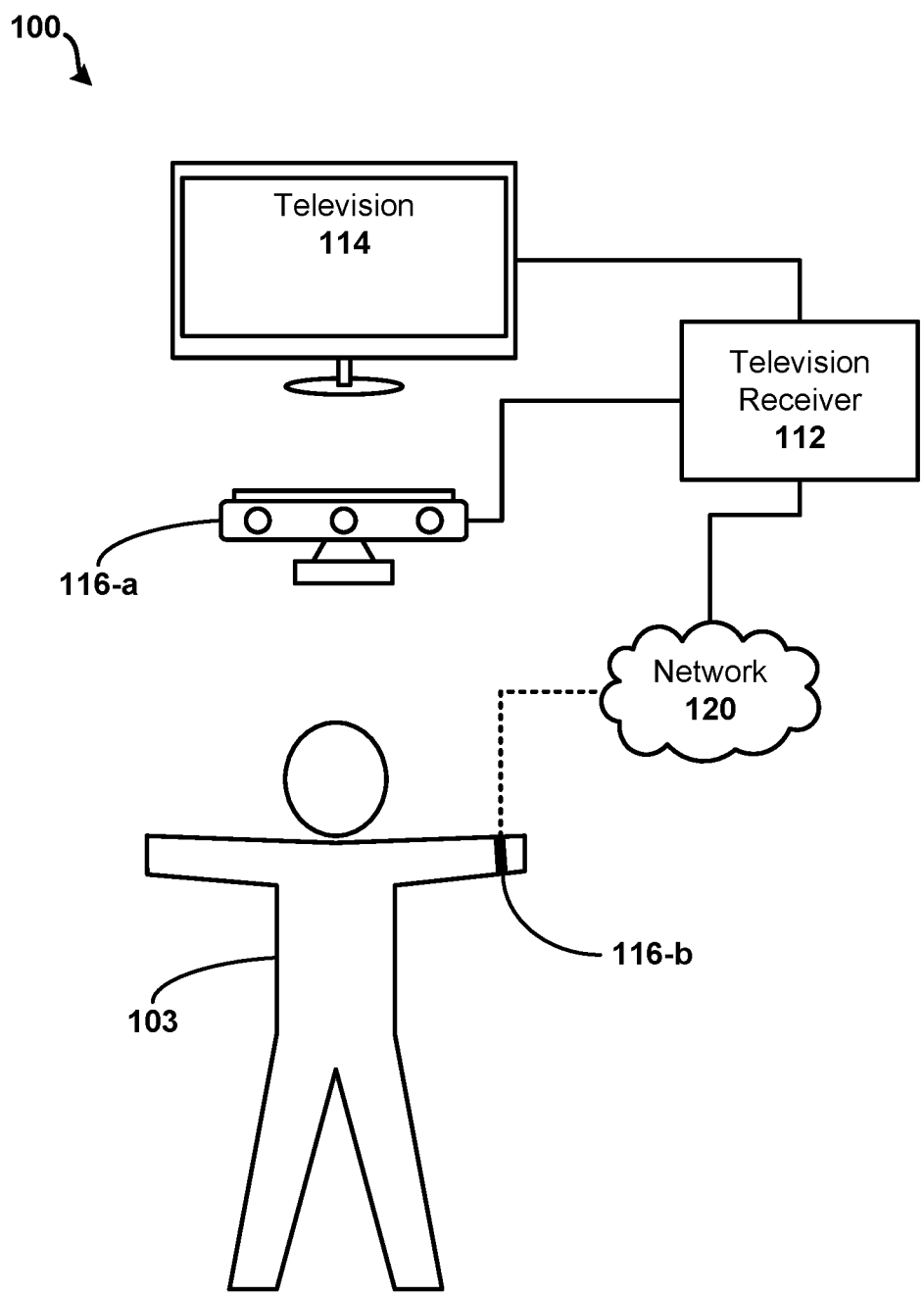
FIG. 1 illustrates an example system for displaying contextual advertisements.

FIG. 1 provides an overview of an example system 100 in which aspects of the present invention are implemented. In FIG. 1, viewer 103 is engaged in viewing video content on television 114. In the embodiment shown, television 114 receives content from television receiver 112, such as by way of network 120 or directly from a connection with a service provider (not shown). Network 120 may include a local area network, a wide area network or the Internet (at least in part), for receiving content streams from a service provider for display on television 114.

As illustrated in FIG. 1, sensors 116-*a* and 116-*b* are in data communication with television receiver 112, optionally by way of network 120. For example, sensor 116-*a* may be directly connected to television receiver 112. Sensor 116-*a* may include, but is not limited to, one or more cameras, such as a video camera, a still image camera, a thermal imaging camera or a range camera, a facial expression detector, a motion detector and/or one or more microphones. Use of cameras, motion detectors, microphones and the like allow sensor 116-*a* to obtain data useful for identifying viewer attribute information, such as a mental, biological or physical characteristic of the user. Communications between sensors 116-*a*, 116-*b* and network 120 may be wired or wireless, and a variety of commercially available sensors may be incorporated into system 100.

In exemplary embodiments, the data obtained from sensor 116-*a* is used to identify or characterize a mental state or a biological state of viewer 103, such as a stress level or a fatigue level. For example, use of one or more cameras may aid in identifying a stress level of viewer 103, such as by determining a temperature of viewer 103 using a thermal imaging camera, and determining a respiratory rate of viewer 103 and/or a heart rate of viewer 103 using a motion detector, video camera or range camera. Using these and/or other biological characteristics, television receiver 112 may compute viewer attribute information that characterizes a mental state of viewer 103. In embodiments, although the actual stress level of a viewer may not be known unless the viewer explicitly provides or confirms this information, biological characteristics may aid in the approximation of the mental or biological state of viewer 103.

In addition to sensor 116-*a*, one or more biosensors 116-*b* may be attached to and/or worn by viewer 103. For example, sensor 116-*b*, shown in FIG. 1, is a wrist strap worn by viewer 103. Sensor 116-*b* may be used to identify one or more biological characteristics of viewer 103, such as a heart rate, a temperature, a blood pressure, etc. The use of other types of biological sensors is contemplated, including, but not limited to, a respiratory rate monitor, a blood glucose level monitor, a skin conductivity sensor and a pulse oximeter.

Optionally, data from sensor 116-*a* and/or biosensor 116-*b* is used to infer a biological characteristic of the viewer, such as an age or gender. In one embodiment, age may be inferred, at least in part, based on pulse rate. Similarly, gender may be inferred, at least in part, based on pulse rate and/or other physical characteristics observable by sensors 116-*a* and 116-*b*, such as facial features. Optionally, biological characteristics may be input by the viewer and/or stored to and/or retrieved from a viewer profile.

In various embodiments, data from sensors 116-*a* and 116-*b* is relayed to a service provider and/or television receiver 112 for characterizing a mental characteristic or biological characteristic of viewer 103 and determining a viewer attribute, which may be directly used by or communicated to the service provider and/or television receiver 112. Viewer attribute information is useful, in various embodiments, for identifying or approximating a mental or biological state of a viewer so that advertisements may be presented to the viewer on television 114 that are associated with, suitable for or otherwise selected based on the mental or biological state of the viewer. In some embodiments, the viewer attribute information is determined in real-time such that characteristics of the viewer can be analyzed or determined on a moment by moment basis and content streams suitable for presenting to the viewer can be provided by the service provider.

Optionally, in embodiments, viewer 103 may provide input indicating their mental or biological state, such as for storage in a viewer profile and/or for use by television receiver 112 and/or service provider for displaying suitable advertisements to viewer 103 on television 114. In one embodiment, the input received from the viewer is indicated as falling on a scale, such as on a scale from 1 to 10 or from 1 to 100. Optionally, a mental or biological characteristic is retrieved from a stored viewer profile and used for displaying suitable advertisements to viewer 103 on television 114.

In one embodiment, if it is determined that the viewer is in a stressed or agitated state, a content stream having a calming character will be provided to television receiver 112 for presentation to viewer 103 on television 114. For example, in one embodiment, a stressed viewer may be presented with advertisements for a vacation or spa treatment. Sensors 116-a and 116-b may optionally aid in determining whether displaying the content stream to the viewer 103 resulted in a change in the viewer's mental state.

In another embodiment, a stressed viewer may be presented an alternate version of a content stream as compared to a calm or relaxed viewer. In various embodiments, multiple versions of advertisements may be created and tagged with various content attributes to aid in the selection of a suitable advertisement for presenting to a viewer when the viewer's mental or biological characteristics are taken into consideration.

As an example of one advertisement where aspects of the invention are useful, consider a movie preview for an action movie. Multiple versions of the movie preview may be produced for showing to various viewers based on the mental or biological characteristics of the viewer. For example, highly stimulating versions can be produced and simpler, purely informative or less stimulating versions can be produced. The producer or service provider may tag the different versions of the preview with content attributes that indicate target or threshold viewer attributes that, at least in part, indicate a target audience or target viewer mental state for the different versions of the preview. Depending on the viewer and the preview shown, such a preview may cause expected or unexpected changes to the viewer's mental or physical state. In embodiments, sensors may be used for identifying, in real-time, a change in the viewer's mental or physical state upon being shown a particular version of an advertisement.

For example, a stressed or agitated viewer may optionally be presented with a less intense or stimulating preview than presented to a calm viewer. Other biological characteristics may be taken into consideration. For example, a viewer with a heart condition and/or high blood pressure may be shown only versions of the preview less likely to exacerbate the viewer's condition. Additional biological characteristics, such as age or gender may also be taken into consideration. For example, a male viewer may be presented with one version of the preview, while a female viewer may be presented with a different version of the preview. Similarly, child and adult viewers may be shown different versions of the preview that are suitable for the respective viewers. In this way, advertising may be targeted towards suitable viewers based on the mental or biological characteristics of the viewers.

Figure 2:
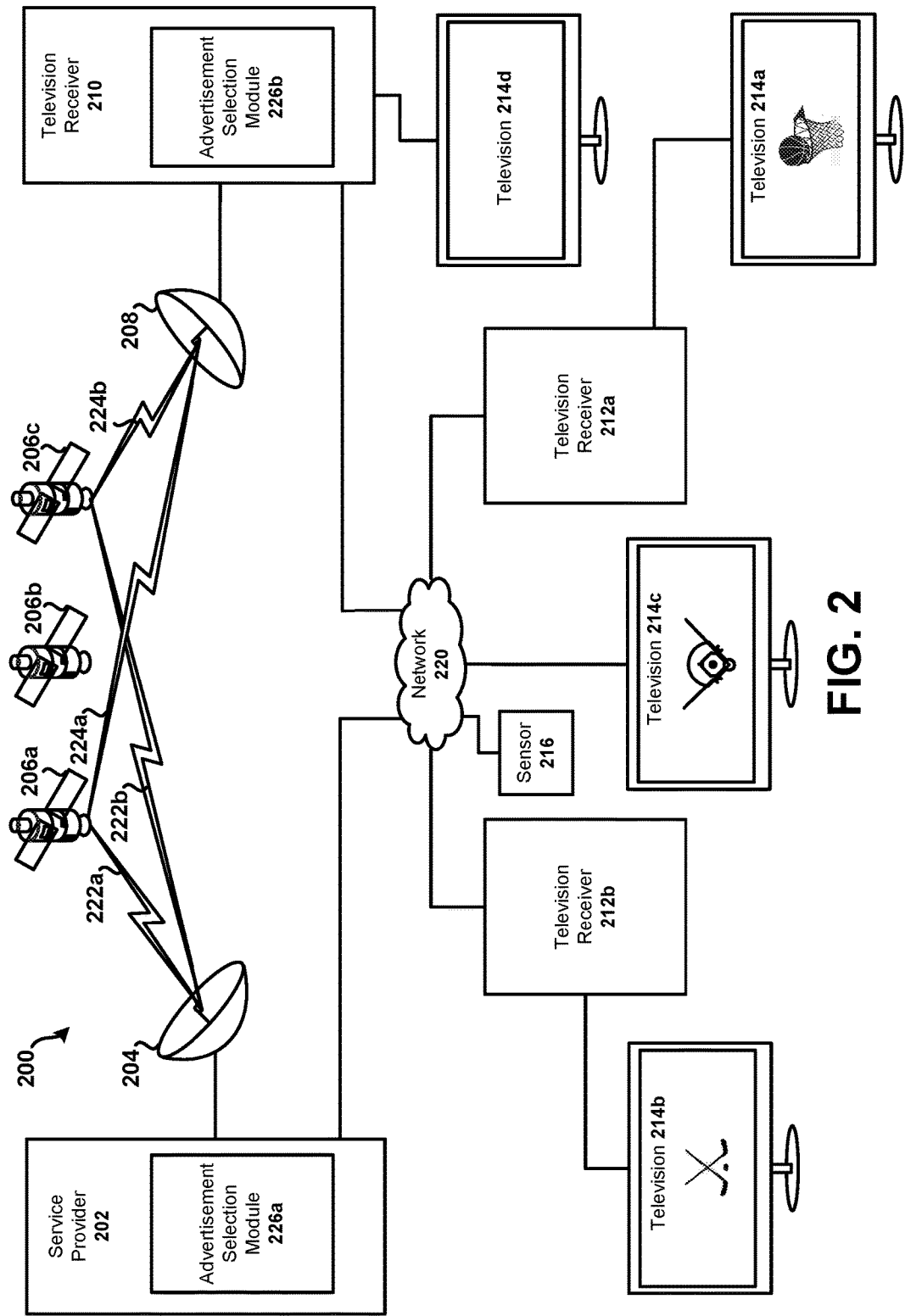
FIG. 2 illustrates an example media content distribution system.

Referring now to FIG. 2, an example media content distribution system 200 is shown in which aspects of the present disclosure may be implemented. For brevity, the system 200 is depicted in a simplified and conceptual form, and may generally include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of media or content distribution system. Although the depicted system 200 identifies a satellite based content distribution system, the invention may be implemented and/or used with any type of television or video distribution system, such as cable, terrestrial/over the air, IPTV, on demand, subscription-based, network-based, etc. Optionally, the depicted system 200 may be used with a digital video recorder (DVR) system, where content received from a television or video distribution system is recorded for later playback.

The example system 200 may include a service provider 202, a satellite uplink 204, a plurality of orbiting (e.g., geosynchronous) satellites 206a-c, a satellite dish 208, a primary television receiver 210, a plurality of secondary television receivers 212a-b, and a plurality of televisions 214a-d. In the present example, the primary television receiver 210 may at least include an advertisement selection module 226b. The advertisement selection module 226b in one embodiment may be configured to access a viewer profile or a viewer attribute information, as discussed below. The advertisement selection module 226b may be implemented as computer code that is executed by one or more processors within either the primary television receiver or a secondary television receiver. In another embodiment, the advertising selection module may be implemented either as firmware or dedicated hardware. Similarly, the service provider 202 may include an advertisement selection module 226a, which may be configured to access a viewer profile or viewer attribute information and provide advertising content for either the primary television receiver 210 or a secondary television receiver 212a-b. Optionally, advertisement selection modules are included in one or more secondary television receivers 212a-b.

The system 200 may also include at least one network 220 that establishes a bi-directional communication path for data transfer between and among any of the primary television receiver 210, secondary television receivers 212a-b, televisions 214a-d, and sensor 216 of the example system 200. In some embodiments, sensor 216 may be in data communication with any one or more of the primary television receiver 210, secondary television receivers 212a-b, televisions 214a-d and network 220. Optionally, sensor 216 may be in data communication with service provider 202, such as by way of network 220.

In some embodiments, the network 220 may further establish a bi-directional communication path (not shown) for data transfer between the primary television receiver 210 and the service provider 202. The network 220 is intended to represent any number of terrestrial and/or non-terrestrial network features or elements. For example, the network 220 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 200.

The primary television receiver 210, and the secondary television receivers 212a-b, as described throughout may generally be any type of television receiver, such as a set top box or TV dongle, for example. In another example, the primary television receiver 210, and the secondary television receivers 212a-b, may exhibit functionality integrated as part of or into a television, monitor, a digital video recorder (DVR), a computing device, such as a tablet computing device, or any other computing system or device, as well as variations thereof. Further, the primary television receiver 210 and the network 220, together with the secondary television receivers 212a-b, televisions 214a-d, and optionally one or more sensors 216, may form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In practice, the satellites 206a-c may be configured to receive uplink signals 222a-b from the satellite uplink 204. In this example, the uplink signals 222a-b may contain one or more transponder streams of particular data or content, such as content streams, like particular television channels or other data feeds, that is supplied by the service provider 202. For example, each of the respective uplink signals 222a-b may contain various media content such a plurality of encoded HD (High Definition) television channels, various SD (Standard Definition) television channels, audio programming, on-demand programming, programming information, advertisements, and/or any other content in the form of at least one transponder stream, and in accordance with an allotted carrier frequency and bandwidth. In this example, different media content may be carried using different ones of the satellites 206a-c. Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc.

The satellites 206a-c may further be configured to relay the uplink signals 222a-b to the satellite dish 208 as downlink signals 224a-b. Similar to the uplink signals 222a-b, each of the downlink signals 224a-b may contain one or more transponder streams of particular data or content, such as various encoded and/or at least partially electronically scrambled television channels, advertisements, on-demand programming, etc., in accordance with an allotted carrier frequency and bandwidth. The downlink signals 224a-b, however, may not necessarily contain the same or similar content as a corresponding one of the uplink signals 222a-b. For example, the uplink signal 222a may include a first transponder stream containing at least a first group or grouping of television channels, and the downlink signal 224a may include a second transponder stream containing at least a second, different group or grouping of television channels. In other examples, the first and second group of television channels may have one or more television channels in common. In sum, there may be varying degrees of correlation between the uplink signals 222a-b and the downlink signals 224a-b, both in terms of content and underlying characteristics.

Continuing with the example implementation scenario, the satellite dish 208 may be provided for use to receive one or more content streams, for example live, prerecorded or on-demand television programming, such as on a subscription basis, provided by the service provider 202, satellite uplink 204, and/or satellites 206a-c. For example, the satellite dish 208 may be configured to receive particular transponder streams, or downlink signals 224a-b, from one or more of the satellites 206a-c. Based on the characteristics of the primary television receiver 210 and/or satellite dish 208, however, it may only be possible to capture transponder streams from a limited number of transponders concurrently. For example, a tuner of the primary television receiver 210 may only be able to tune to a single transponder stream from a transponder of a single satellite, such as satellite 206a, at a time. In certain embodiments, however, a tuner of primary television receiver 210 may be able to simultaneously receive multiple transponder streams.

Additionally, the primary television receiver 210, which is communicatively coupled to the satellite dish 208, may subsequently select a content stream via a tuner, decode, and relay particular transponder streams to the television 214c or 214d for display thereon. For example, the satellite dish 208 and the primary television receiver 210 may, respectively, be configured to receive, decode, and relay at least one premium high definition (HD) formatted television channel to the television 214c. Programming or content associated with the HD channel may generally be presented "live," or from a recording as previously stored on, by, or at the primary television receiver 210. In this example, the HD channel may be output to the television 214c in accordance with the HDMI/HDCP content protection technologies. Other embodiments are possible. For example, in some embodiments, the HD channel may be output to the television 214c in accordance with the MoCA® (Multimedia over Coax Alliance) home entertainment networking standard. Still other embodiments are possible.

Further, the primary television receiver 210 may select, via one or more tuners, decode, and relay particular transponder streams to one or both of the secondary television receivers 212a-b, which may in turn relay particular transponder streams to a corresponding one of the television 214a and the television 214a for display thereon. For example, the satellite dish 208 and the primary television receiver 210 may, respectively, be configured to receive, decode, and relay at least one television channel to the television 214a by way of the secondary television receiver 212a. Similar to the above-example, the television channel may generally be presented "live," or from a recording as previously stored on the primary television receiver 210, and may be output to the television 214a by way of the secondary television receiver 212a in accordance with a particular content protection technology and/or networking standard. Other embodiments are possible.

Figure 3:
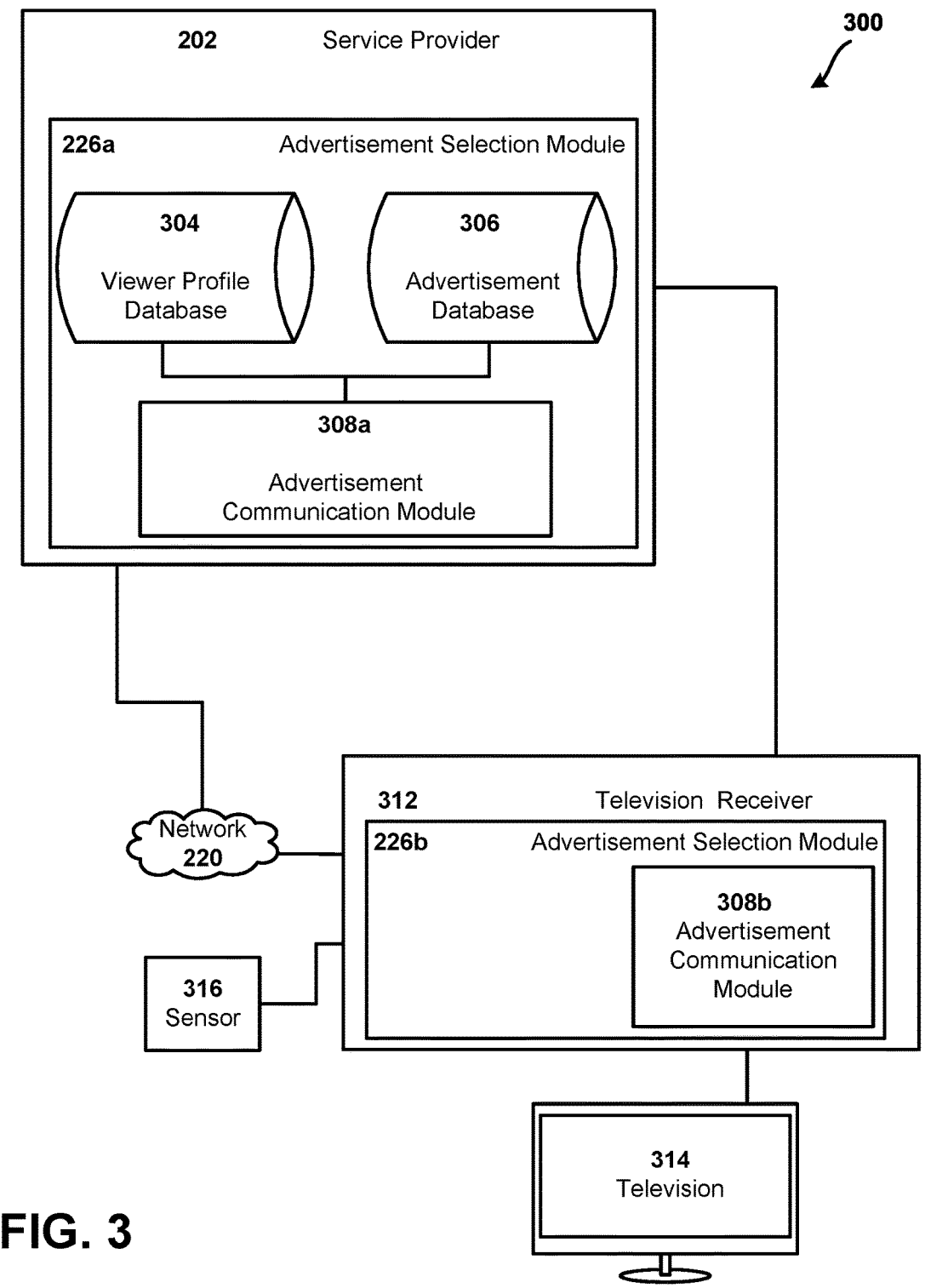
FIG. 3 illustrates details of a system for displaying contextual advertisements.

Referring now to FIG. 3, an example embodiment 300 is shown for elements of service provider 202 and of television receiver 312. In embodiments, the television receiver 312 is a primary television receiver 210 or a secondary television receiver 212a-b. The television receiver 312 is communicatively linked with at least one television 314. A communication link may be established between television receiver 312 and service provider, such as through the network 220 or through a cable system or satellite system. One or more sensors 316 may be in data communication with network 220, television receiver 312, television 314 and/or service provider 202.

The advertisement selection module 226a may include a viewer profile database 304, an advertisement database 306, and an advertisement communication module 308a. The viewer profile database may store information about individual viewers of the service provider 202. Such information may be based on personal demographic data, observed viewing history, viewer-supplied preferences, viewer attributes, such as biological or mental characteristics obtained in real-time, and other available information about the viewer. Information in each viewer profile in the viewer profile database may be specific to only one viewer, or it may be specific to a particular group of viewers, such as a family. In embodiments, viewer profile includes viewer attribute information, such as a biological characteristic or a mental characteristic of a viewer and this information is part of viewer profile database 304. Optionally, biological characteristics or mental characteristics are provided by viewer input or are determined using data collected by sensor 316.

The advertisement database 306 may include advertising content that the service provider is configured to provide to viewers. The advertising content may be stored over several devices in various locations. The advertising content may also be organized into content categories according to content attribute information for correlation with categories of viewer attribute information maintained in viewer profiles or determined using data collected by sensor 216. For example, advertising content may specify a content attribute associated with a target or range of viewer attribute information for the intended audience of the advertising content.

The advertisement communication module 308a may be configured to correlate viewer profile information and preferences stored in the viewer profile database 304 and/or viewer attribute information with advertising content stored in the advertisement database 306. The advertisement communication module 308a may be configured to receive requests for a viewer profile from a television receiver, and to transmit the viewer profile to the television receiver.

The advertisement communication module 308a may also be configured to form a direct communication link with the television receiver 312, such as by a satellite link as described in relation to FIG. 2, or by other means such as a cellphone link, cable link, network link, wireless link, or a fiber optic link. The advertisement communication module 308a may transmit advertising content to the television receiver 312 over the direct communication link, which the television receiver 312 may display in real-time, or may store for later display.

In the illustrated exemplary embodiment 300, the television receiver 312 includes an advertisement selection module 226b which may select advertisements for display on television 314, such as by using data received from sensor 316 to aid in making the selection. The advertisement selection module 226b may interface with the service provider 202 using an advertisement communication module 308b. The advertisement communication module 308b may comprise different elements than the advertisement communication module 308a of the service advertisement selection module 226a.

The television receiver 312 may be configured to form a communication link over the network 220 as described above. Using the viewer attribute information, the advertisement selection module 226a of the service provider 202 selects advertising content from the advertisement database 306 to transmit to the television receiver 312 for display. The television receiver 312 may receive and display the selected advertising in real time. Alternatively, the selected advertising may be locally stored in the television receiver 312 for display at a later opportunity.

Figure 4:
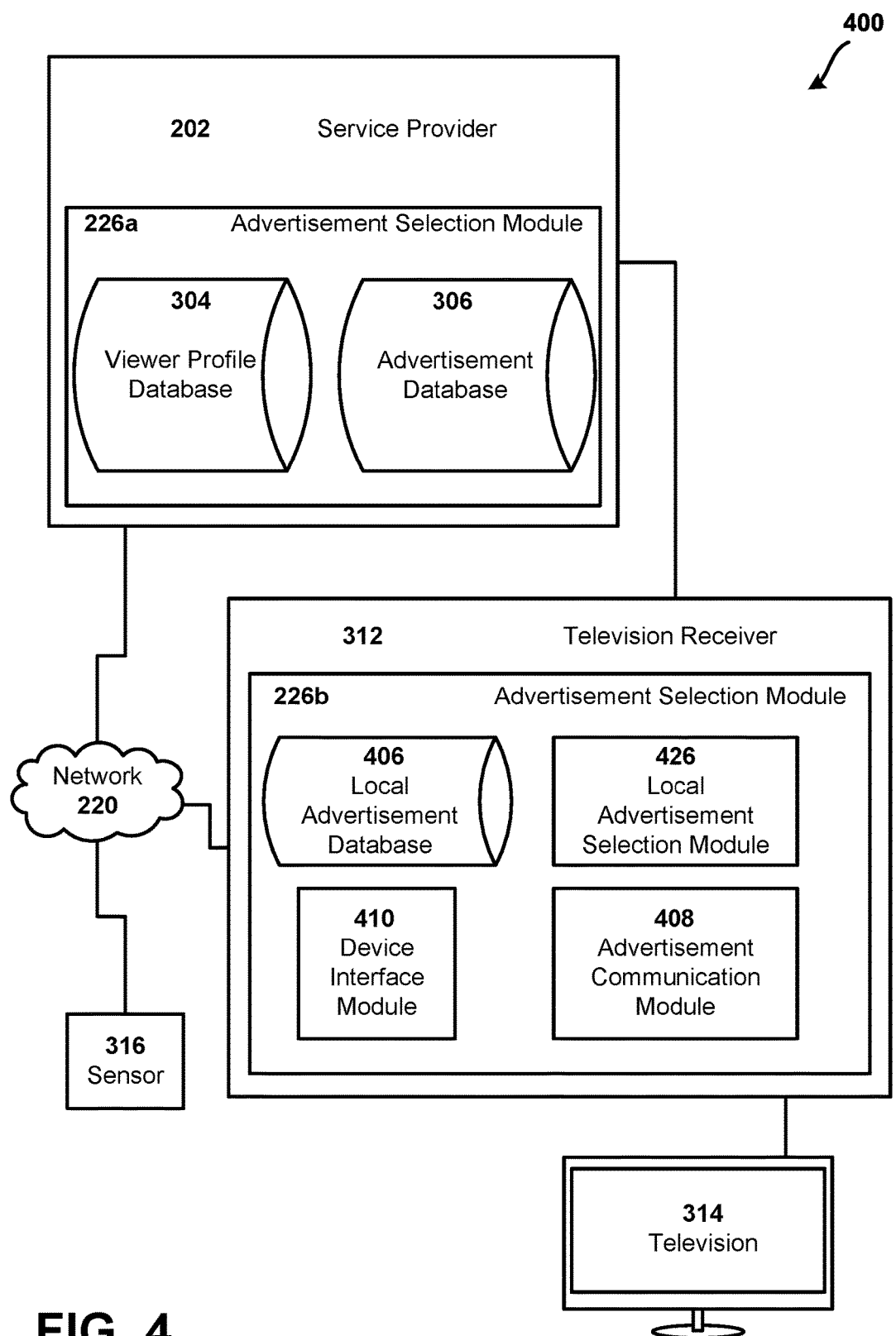
FIG. 4 illustrates details of a system for displaying contextual advertisements.

Referring now to FIG. 4, another example embodiment 400 is shown for elements of service provider 202 and of television receiver 312. The television receiver 312 may correspond to either the primary television receiver 210 or one or more of the secondary television receivers 212a-b. The television receiver 312 is communicatively linked with at least one television 314.

In one embodiment, there may also be one or more direct links between the television receiver 312 and the service provider 202. One may be a link used for delivering programming content to the television receiver 312, such as a downlink signals 224a-b, and an alternate link between the television receiver 312 and the service provider 202. The alternate link may be used for transmission and reception of synchronization messages, billing information, or other messages. The alternate link may also function as a backup programming delivery link. As discussed below, the alternate link may optionally be used by the service provider 202 to deliver advertising content to the television receiver 312. The alternate link optionally uses any of the technologies previously disclosed; examples include a fiber optic or cable connections, a wired network or wireless network connection, a cellphone connection or a DSL connection.

As now described, variations on the configuration are possible. FIG. 4 shows additional and/or alternative configurations of the devices and modules which may be used to implement methods of the present disclosure. In the embodiments shown in FIG. 4, the advertisement selection module 226a includes the viewer profile database 304 and the advertisement database 306, as described above in reference to FIG. 3. Further, the advertisement selection module 226b may include a local advertisement database 406, a local advertisement selection module 426, a device interface module 410, and an advertising communication module 408.

The local advertising database 406 may store advertising content received from the service provider 202. The advertising content in local advertising database 406 may be received by the television receiver 312 during periods of low or no programming display, and may comprise advertising from the advertisement database 306 of the service provider 202. It may also be included in a programming stream from the service provider 202, and the local advertising selection module 426 may determine when which advertising content included in the programming stream is intended for the television receiver 312 and which advertising content is to be stored in local advertisement database 406.

As mentioned above, the advertisement selection module 226b of the television receiver 312 may optionally include the device interface module 410 that is configured to form communication links with a plurality of sensor devices, such as directly or over the network 220. Device interface module 410 may receive sensor data from sensor 316 and compute viewer attribute information, such as to characterize a mental state of the viewer, such as a stress or relaxation state. Local advertisement selection module 426 may further make use of the sensor data and/or viewer attribute information to identify appropriate advertisements to display to the viewer in accordance with one or more advertisement rules, guidelines or thresholds, such as a content attribute of an advertisement stream.

The communication links between the television receiver 312 and sensors 316 may be wired or wireless. Also, the advertisement selection module 226*b* of the television receiver 312 may include the advertisement communication module 408 by which the advertisement selection module 226*b* communicates with the service provider 202 to access or provide a viewer profile or viewer attribute information for a viewer.

Figure 5:
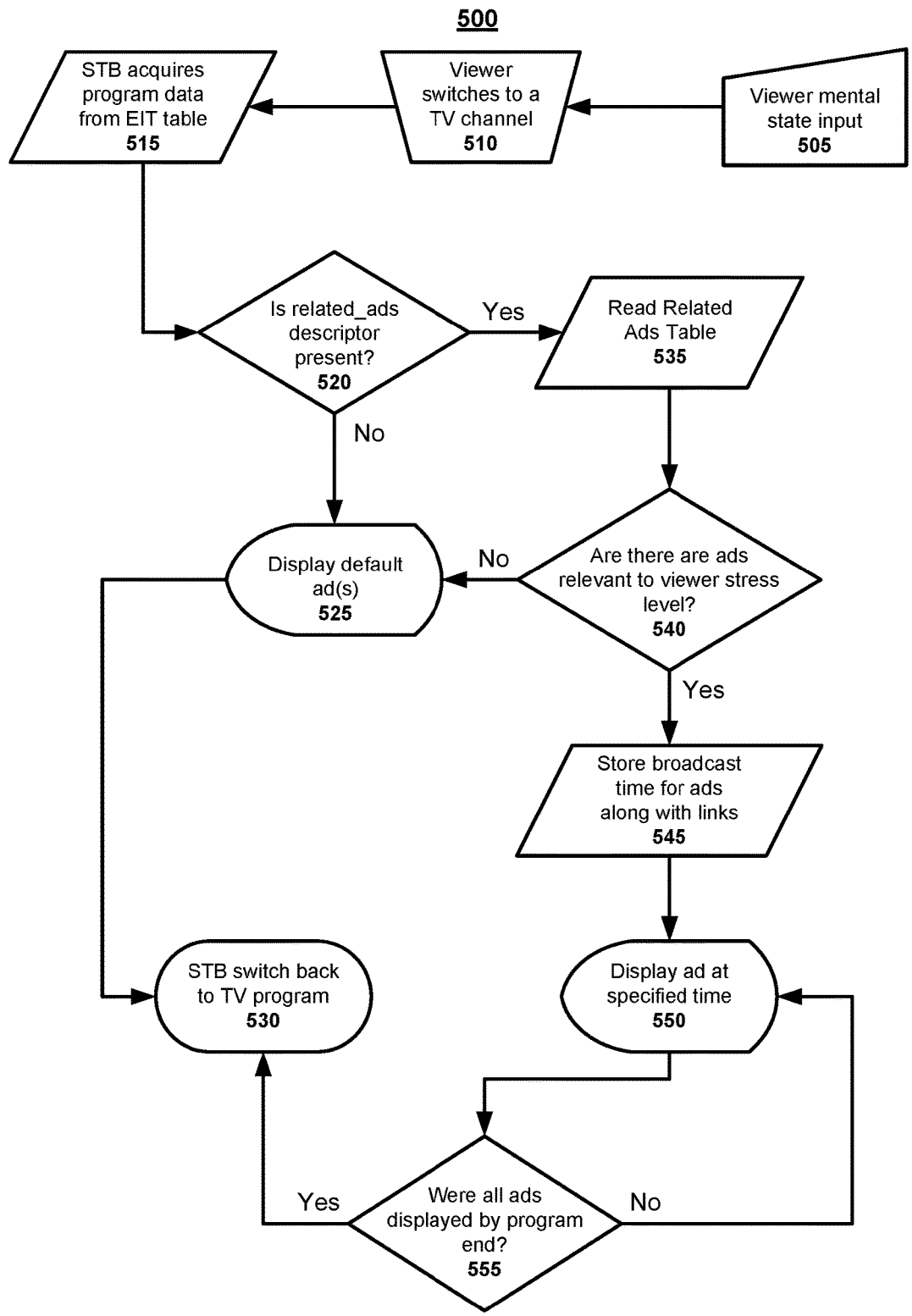
FIG. 5 provides an overview of an exemplary method for performing aspects of the invention.

FIG. 5 provides an overview of an exemplary method 500 for showing advertisements to a TV viewer based on their stress or relaxation level. In embodiments, the stress level is measured using one or more sensors, which transmit data to a television receiver, such as a set top box, or to a service provider. For example, if a viewer is stressed, a yoga class advertisement or a vacation tour advertisement may be shown to the viewer. Such embodiments advantageously aid in de-stressing viewers by providing avenues for relieving stress through advertisements.

Switching to an appropriate advertisement that corresponds to or is determined based on the viewer's stress level is performed, in embodiments, by incorporating an Ads Referencing (AR) content identifier into a digital video broadcasting (DVB) transport stream (TS). Incorporation of the AR into DVB TSs can be achieved through a number of techniques, such as, in a similar way to the incorporation of a Content Referencing (CR) content identifier as described in the European Telecommunications Standards Institute (ETSI) Technical Specification (TS) 102 822-4, which is hereby incorporated by reference.

For purposes of implementing AR, a user defined descriptor may be added to the Event Information Table (EIT), for example into the EIT p/f actual or EIT p/f other tables. Details of EIT can be found in the ETSI European Standard, telecommunications series (EN) 300 468, which is hereby incorporated by reference. For example, descriptors with tags in the user defined range of 0x80 to 0xFE can be used.

In one embodiment, the descriptor is named "related_ads" and is tagged with a value of 0xF0. If the "related_ads" descriptor is present in the EIT table, this means that a Related Ads Table must be present in an elementary stream with a pre-defined identifier. Implementation of the "related_ads" descriptor and the associated table is achieved in a similar way to the Related Content table described in ETSI TS 102 323, which is hereby incorporated by reference.

The Related Ads Table can be assigned a table_id value between 0x80 and 0xFE. In one example, the value of 0xF0 is reserved for the table_id value. The Related Ads Table includes links to the related advertisements being broadcasted or to be broadcasted. The links to the related ads can be achieved using one or more locators and instance metadata identifiers (IMI), such as is described in the ETSI TS 102-822-4. The configuration optionally uses the AR identifiers to specify the linked content, and the IMI to associate the viewer stress level with the corresponding advertisement that is transmitted and/or displayed.

In one embodiment, two versions of an advertisement are created and tagged with IMIs corresponding to two different stress levels. For example, the IMI for the first stress level is imi:provider.com/1 and the IMI for the second stress level is imi:provider.com/2. As will be understood by the skilled artisan, these IMI values are provided merely as an example and the actual IMI values may be different and various different numbers of stress or other mental state or biological state levels may be identified.

The Related Ads Table will correlate these IMI values with locator identifiers for each advertisement. For example, for the IMI imi:provider.com/1, the locator may be dvb://123.5ac.100;1e4a~20011207T150000ZPT0210, and the locator for the IMI imi:provider.com/2 may be http://example.net/mirror/def123.mov. Again, these locator values are provided merely as examples and the skilled artisan will appreciate that the examples illustrate how the Related Ads Table, IMI values and Locator values may be used in various implementations of the invention. In various embodiments, the locators point to advertisements stored at a remote server, such as by the service provider, or to advertisements stored locally by a television receiver. Optionally, the locators point to a "live" content stream, such as a linear television channel that is provided in real-time.

In FIG. 5, at 505, the viewer's mental state is input. The mental state of the viewer can be determined automatically, for example using one or more sensors, or manually, through input provided by the viewer. Alternatively, a series of questions can be asked of the viewer and the viewer's stress level determined based on the answers provided by the viewer.

At 510, the viewer switches to a TV channel. For example, the viewer may switch to a live TV channel or a prerecorded TV channel. At 515, program data for the TV channel is acquired by the television receiver or set top box (STB), such as program data from an EIT. Next, at 520, it is determined whether an appropriate descriptor, such as a "related_ads" descriptor, is present in the program data. If not, a default advertisement(s) is displayed, at 525. After the default advertisement(s) completes, the set top box returns to the TV program, at 530.

If the related_ads descriptor is present, the Related Ads Table is read, at 535. Based on the Related Ads Table, it is determined whether there are any advertisements relevant to the viewer's stress level, at 540. If there are not any, a default advertisement(s) is displayed, at 525. If there are relevant advertisements to display, the broadcast time for the advertisements, along with appropriate locators are stored, at 545. At 550, the relevant ad is displayed at the specified time. If there are multiple advertisements to display, the algorithm checks for this, at 555. If there are additional advertisements to display, the next advertisement is displayed at the appropriate time, at 550. If there are no additional advertisements to display, the set top box returns to the TV program, at 530. Optionally, the algorithm returns to step 515 when a new program begins or when a new channel is selected.

Figure 6:
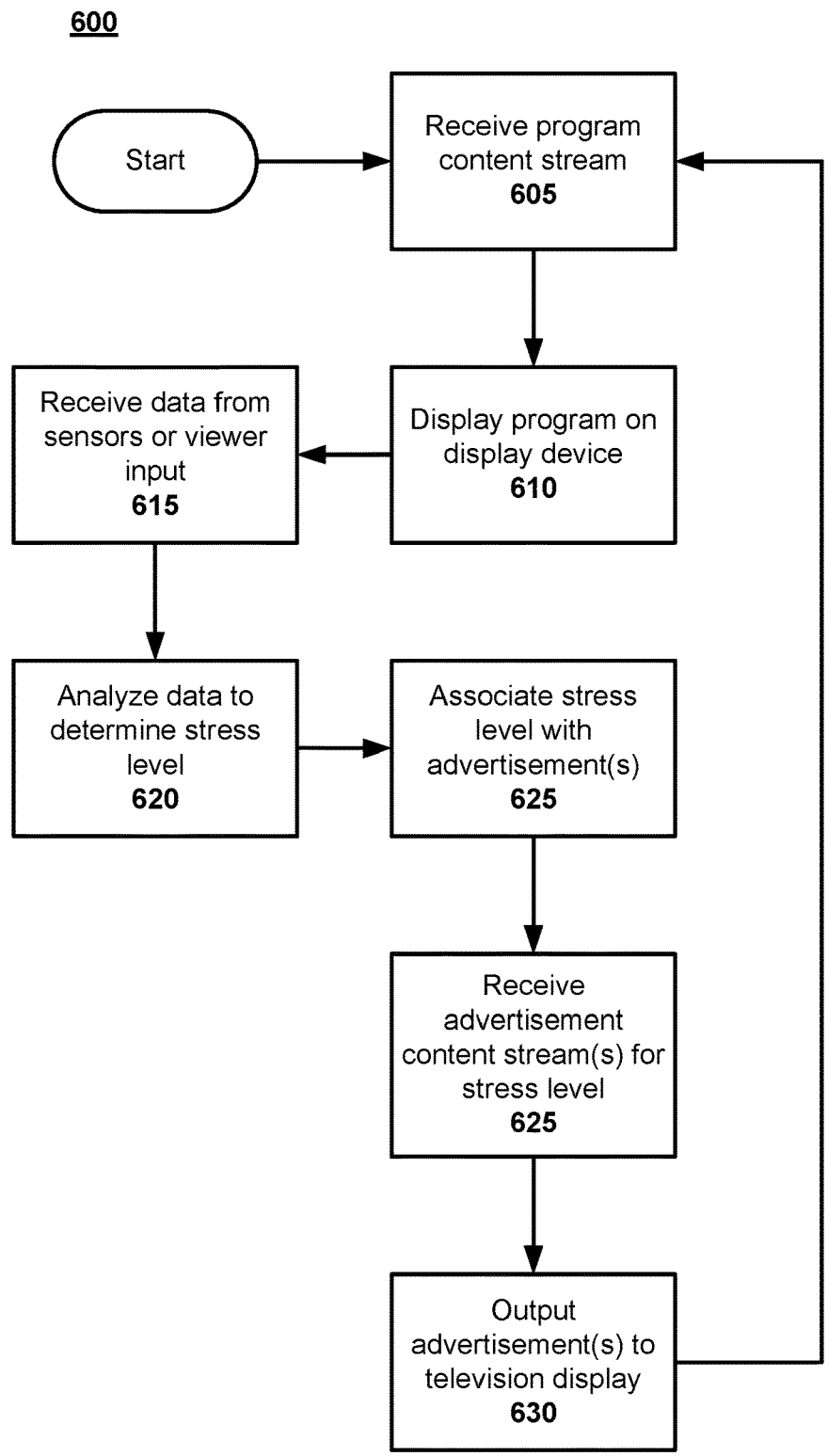
FIG. 6 provides an overview of an exemplary method for performing aspects of the invention.

FIG. 6 provides another method 600 for displaying advertisements based on the stress level of a viewer. The methods starts at 605, where a television program content stream is received, such as by a set top box, television receiver, or display device, such as a television. At 610, the program is displayed on a display device, such as, without limitation, a television, monitor, projector, etc. Techniques are also envisioned where the display is a computer display or a mobile device display, such as a laptop LCD screen or a tablet or smartphone display.

At 615, data is received, such as from one or more sensors or based on user input and, at 620, the data is analyzed to determine the stress level of the viewer. For example, biometric sensors can be used for aspects of this methods. Alternatively or additionally, environmental sensors, such as cameras, motion detectors and the like, can be used for aspects of this method. Alternatively or additionally, viewer input can provide information regarding the viewer's stress level. For example, the viewer can manually enter the stress level, such as according to a scale from 1 to 10. As another example, the viewer can answer a questionnaire or take a test with the answers providing an indication of the viewer's stress level. Alternatively or additionally, stress data can be stored to and/or retrieved from a viewer profile.

In one embodiment, biosensors are used to obtain physiological data from a viewer. For example, data is optionally gathered using one or more sensors placed in contact with a viewer's skin. Examples include, but are not limited to EEG (electroencephalography) data, EKG (electrocardiography) data, EMG (electromyography) data, HRV (heart rate variability) data, SCR (skin conductance response) data and the like. The data is then processed in order to obtain stress and/or attention levels, for example. Various vendors provide biosensors useful for aspects of this invention including Emotiv, NeuroSky, and OP-Innovations.

In another embodiment, one or more microphones are used to collect voice data from the viewer for voice stress analysis, such as according to the techniques described by Rothkrantz et al. at http://www.ai.rug.nl/conf/bnaic2004/ap/a18.pdf, which is hereby incorporated by reference. In various embodiments, background monitoring of viewer voice data is performed. In other embodiments, active viewer voice data is collected, such as by prompting the viewer to answer one or more questions or to read one or more written passages. Optionally, voice data is collected as a viewer speaks commands to a television receiver or other interface for receiving voice commands.

In another embodiment, one or more video or still image cameras are used to collect facial data from the viewer to identify a mental, emotional or stress state of the viewer, or changes thereto, using facial expression recognition. Gao et al. describe a technique for detecting emotional stress from facial expressions at http://infoscience.epfl.ch/record/200407/files/icip1024-cam-ready.pdf, which is hereby incorporated by reference.

Figure 7:
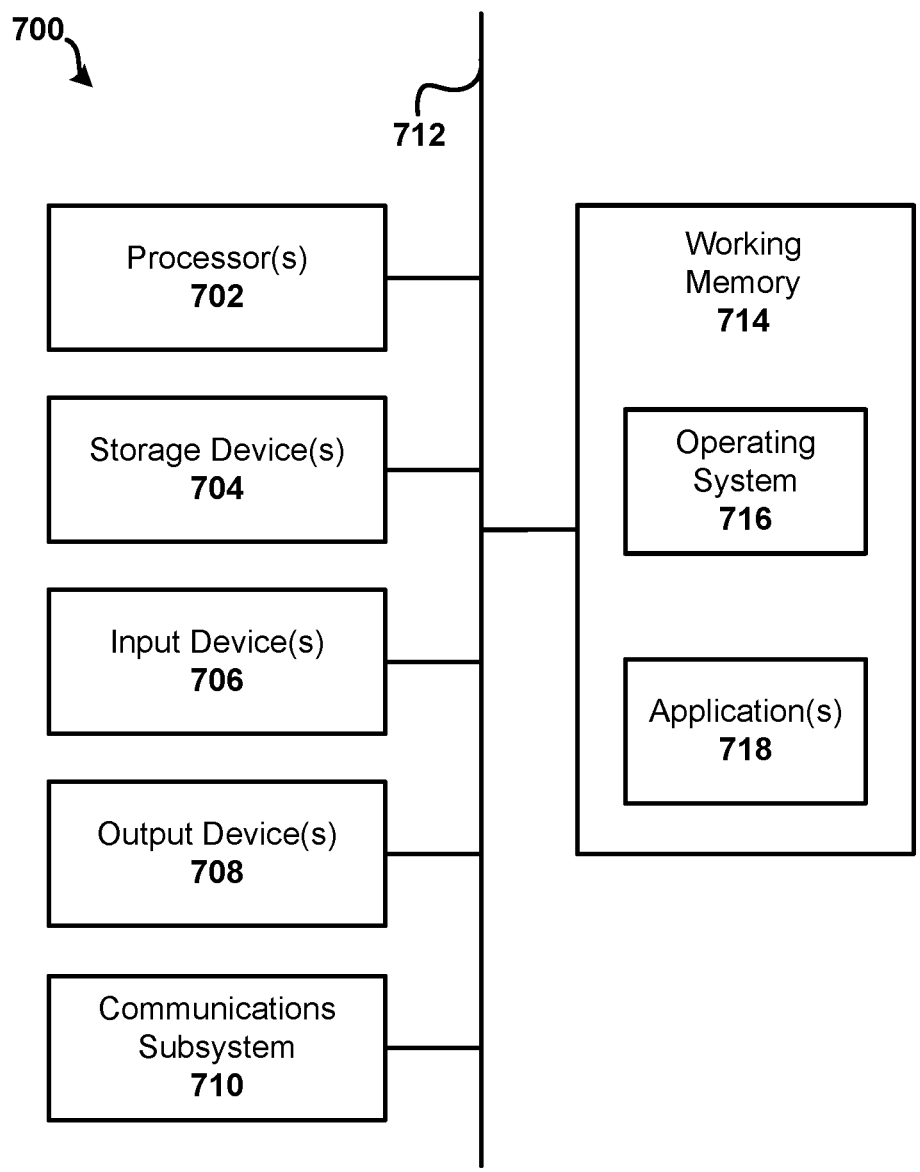
FIG. 7 shows an example of a computing system or device.

FIG. 7 shows an example of a computing system or device 700. The computer system 700 may be incorporated as part of one or more of the elements of the media content distribution system of FIG. 2. The computer device 700 may perform one or more steps, operations, modules, etc., of the methods of FIGS. 5-6. FIG. 7 is intended to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 712 (or may otherwise be in communication, as appropriate). The hardware elements may include one or more processors 702, including without limitation one or more general-purpose processors and/or one or more special-purpose processors (such as digital signal processing chips, graphics acceleration processors, and/or the like); one or more input devices 706, which can include without limitation a mouse, a keyboard, sensors, and/or the like; and one or more output devices 708, which may include without limitation a display device, a printer, and/or the like.

The computer device 700 may further include (and/or be in communication with) one or more non-transitory storage devices 704, which may comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 optionally also includes a communications subsystem 710, which can include without limitation a modem, a network card (wireless or wired), an infrared communication device, a wireless communication device, and/or a chipset (such as a Bluetooth device, an 802.11 device, a WiFi device, a WiMax device, cellular communication facilities, etc.), and/or the like. The communications subsystem 710 may permit data to be exchanged with a network (such as the network described below, to name one example), other computer systems, and/or any other devices described herein. In many embodiments, the computer device 700 will further comprise a working memory 714, which can include a RAM or ROM device, as described above.

The computer system 700 may also comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 704 described above. In some cases, the storage medium might be incorporated within a computer system, such as computer device 700. In other embodiments, the storage medium might be separate from a computer system (e.g., a removable medium, such as a compact disc), and/or provided in an installation package, such that the storage medium may be used to program, configure, and/or adapt a general purpose computer with the instructions/code stored thereon. These instructions optionally take the form of executable code, which is executable by the computer system 700 and/or optionally take the form of source and/or installable code, which, upon compilation and/or installation on the computer device 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, the computer system 700 may perform methods in accordance with various embodiments of the disclosure. For example, some or all of the procedures of such methods are performed by the computer device 700 in response to processor 702 executing one or more sequences of one or more instructions (which might be incorporated into the operating system 716 and/or other code, such as an application program 718) contained in the working memory 714. Such instructions may be read into the working memory 714 from another computer-readable medium, such as one or more of the non-transitory storage device(s) 704. Merely by way of example, execution of the sequences of instructions contained in the working memory 714 might cause the processor(s) 702 to perform one or more procedures of the methods described herein.

The terms "machine-readable medium" and "computer-readable medium," as used herein, refer to any non-transitory medium that participates in providing data that causes a machine to operate in a specific fashion and/or to perform specific operations. In some embodiments implemented using the computer system 700, various computer-readable media might be involved in providing instructions/code to processor(s) 702 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 704. Volatile media include, without limitation, dynamic memory, such as the working memory 714.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 702 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer device 700.

The communications subsystem 710 (and/or components thereof) generally may receive signals, and the bus 712 then might carry the signals (and/or the data, instructions, etc. carried by the signals) to the working memory 714, from which the processor(s) 702 retrieves and executes the instructions. The instructions received by the working memory 714 may optionally be stored on a non-transitory storage device 704 either before or after execution by the processor(s) 702.

It should further be understood that the components of computer system 700 may be distributed across a network. For example, some processing may be performed in one location using a first processor while other processing may be performed by another processor remote from the first processor. Other components of computer device 700 may be similarly distributed.

Figure 8:
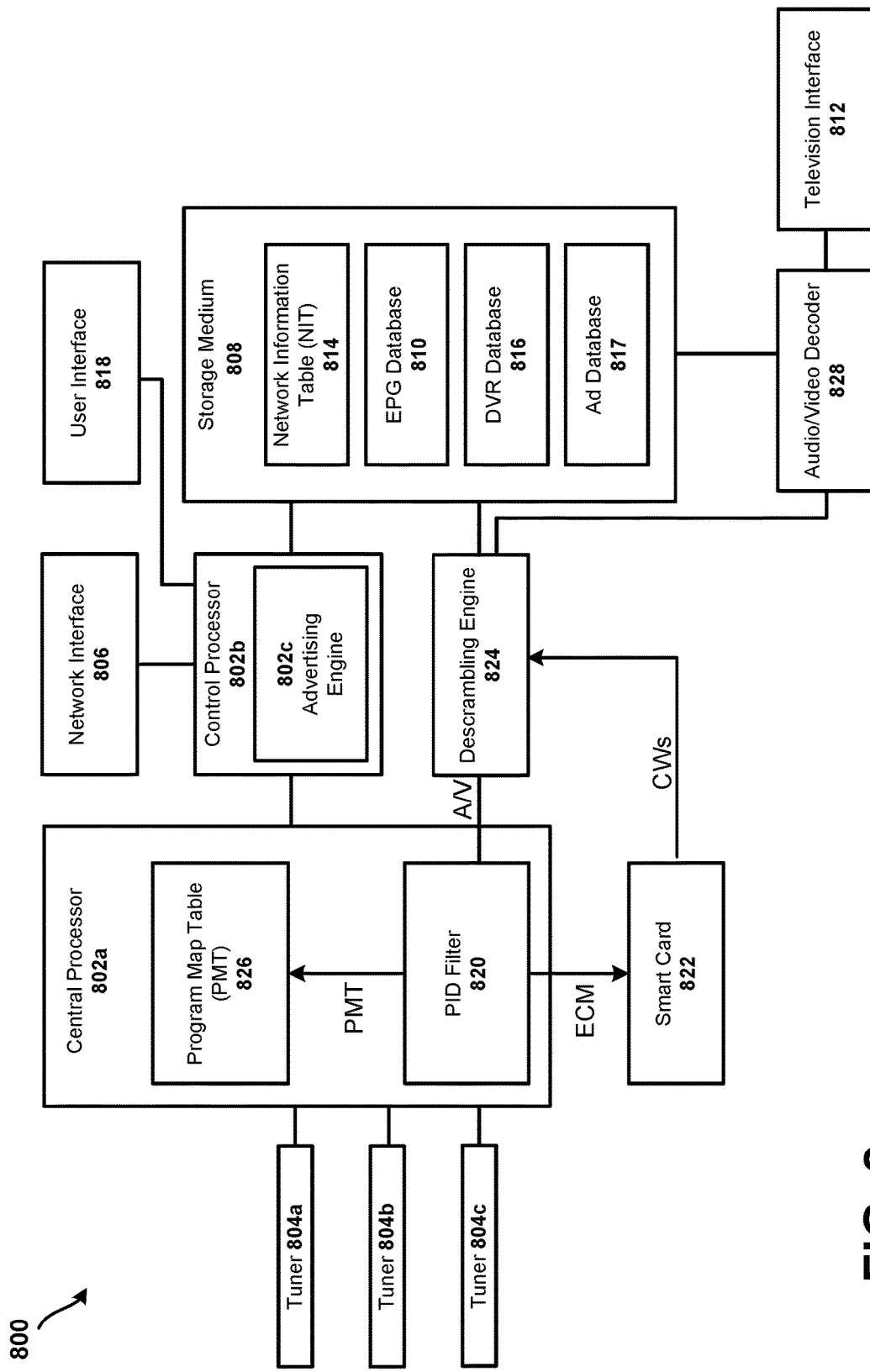
FIG. 8 shows a simplified block diagram of a television receiver.

Referring now to FIG. 8, a simplified block diagram of a television receiver 800 is shown. For example, the diagram may refer to the primary television receiver 210 of FIG. 2. For brevity, the following description refers to the primary television receiver 210 but is to be understood as also describing some elements that may also be present in a secondary television receiver 212*a-b*. For brevity, the television receiver 800 is depicted in a simplified and conceptual form, and may generally include more or fewer elements or components as desired in accordance with the present disclosure. For example, the television receiver 800 shown in FIG. 8 may include the advertisement selection module 226*b*. Additionally, although not explicitly shown in FIG. 8, the television receiver 800 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the television receiver 800 may be configured to include any number of other various components or logical modules that are implemented in hardware, software, firmware, or any combination thereof, and such components or logical modules may or may not be implementation-specific.

In some embodiments, the primary television receiver 210 and/or the secondary television receivers 212*a-b* comprise a set top box. In addition to being in the form of a set top box, at least the primary television receiver 210 may be incorporated into another device, such as the television 214*c*. For example, the television 214*c* may have an integrated television receiver that does not involve an external set top box being coupled with the television 214*c*. A set top box may contain some or all of the components of the primary television receiver 210 and/or may be able to perform some or all of the functions of the primary television receiver 210. Accordingly, instances in this document referring to a set top box, and steps being performed by a set top box, may also be performed, more generally, by the primary television receiver 210, secondary television receivers 212*a-b* or televisions 214*a-d*.

Referring still to FIG. 8, the television receiver 800 may be configured to record omnibus channel files and extract a television program or advertisement segment from a recorded omnibus channel file, and may include a content management engine, at least one processor 802, including a central processor 802*a* and a control processor 802*b*, an advertising engine 802*c*, which may be configured to implement the advertisement selection module 226*b*, a plurality of tuners 804*a-c*, at least one network interface 806, at least one non-transitory computer-readable storage medium 808, at least one electronic program guide (EPG) database 810, at least one television interface 812, at least one Networking Information Table (NIT) 814, at least one digital video recording (DVR) database 816, at least one user interface 818, at least one packet identifier (packet ID or PID) filter 820, at least one smart card 822, at least one descrambling engine 824, at least one Program Map Table (PMT) 826, at least one decoder 828 and a catalogue database. In other embodiments of the television receiver 800, fewer or greater numbers of components may be present. Further, functionality of one or more components may be combined; for example, functions of the descrambling engine 824 may be performed by the central processor 802*a*. Still further, functionality of components may be spread among additional components. For example, the PID filter 820 may be handled by hardware and/or software separate from the PMT 826.

The processor 802 may include one or more specialized and/or general-purpose processors configured to perform processes such as tuning to a particular channel, accessing and displaying EPG information from the EPG database 810, and/or receiving and processing input from a user. For example, processor 802 may include one or more processors dedicated to decoding video signals from a particular format, such as MPEG (Moving Picture Experts Group), for output and display on a television and for performing decryption.

The control processor 802*b* may communicate with the central processor 802*a*. The control processor 802*b* may control the recording of content based on timers stored in the DVR database 816. The control processor 802*b* may initiate recording of content by sending a record command along with an indication of the channel, frequency or stream to be recorded to the central processor 802*a*. The control processor 802*b* may not send a second record command, when additional recording is to begin at the same time, until an acknowledgement that recording of the first stream has successfully been received and initiated by the central processor 802*a*. The control processor 802*b* may also provide commands to the central processor 802*a* when recording of a stream is to cease. In addition to providing commands relating to the recording of streams, the control processor 802*b* may provide commands to the central processor 802*a* that indicate streams to be output to the decoder 828 for output to a presentation device, such as the television 214*c* for example.

The control processor 802*b* may also communicate with the network interface 806 and a user interface 818. The control processor 802*b* may handle incoming data from the network interface 806 and the user interface 818. Additionally, the control processor 802*b* may be configured to output data via the network interface 806.

The tuners 804*a-c* may be used to tune to various content streams, such as television channels transmitted via satellite or cable, such as satellites 206*a-c*. Each respective one of the tuner 804*a-c* may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 804*a*) may be used to tune to a television channel on a first transponder stream for display using a television, while another tuner (e.g., tuner 804*b*) may be used to tune to a television channel on a second transponder for recording and viewing at some other time. Still another tuner (e.g., tuner 804*c*) may be used to check various streams to determine if they are available or not. If multiple television channels transmitted on the same transponder stream are desired, a particular tuner (e.g., tuner 804*a*) may be used to receive the signal stream containing the multiple television channels for presentation and/or recording. The tuners 804*a-c* may receive commands from the central processor 802*a*. Such commands may instruct the tuners 804*a-c* which frequencies are to be used for tuning.

Optionally, an additional tuner may be included for receiving a stream of data corresponding to advertisements from a satellite transponder or cable RF channel and recording the stream to a storage medium 808. Optionally, one or more advertisement streams and television program streams are included within a single transponder stream. The one or more advertisement streams may be used for receiving advertisements while a viewer is accessing a specific satellite transponder or cable RF channel. In one embodiment, the satellite transponder, cable RF channel, or advertisement stream within a single transponder stream is not accessible by a user but is used internally within television receiver 800 for purposes of receiving and storing advertisements for later use. For example, upon storing received advertisements, an advertisement (Ad) database 817 can indicate a content identifier for the received advertisements so that the advertisements can be matched appropriately to a viewer's mental or biological characteristics, such as those estimated in real-time based on data from one or more sensors.

The network interface 806 may be used to communicate via an alternate communication channel with a service provider. For example, the primary communication channel may be via satellite, which may be unidirectional to the set top box, and the alternate communication channel, which may be bi-directional, may be via a network, such as the Internet. The television receiver 800 may be able to communicate with the service provider, such as the service provider 202 of FIG. 2, via a network, such as the Internet. This communication may be bidirectional. For example, data may be transmitted from the television receiver 800 to the service provider, and from the service provider to the television receiver 800. The network interface 806 may be configured to communicate via one or more networks, such as the Internet, to communicate with the service provider. Information may be transmitted and/or received via the network interface 806.

The storage medium 808 may represent a non-transitory computer-readable storage medium. The storage medium 808 may include memory and/or a hard drive. The storage medium 808 may be used to store information received from one or more satellites and/or information received via the network interface 806. The storage medium 808 may store information related to the EPG database 810, the NIT 814, the DVR database 816 and/or the advertisement database 817. Recorded television programs and advertisements may be stored using the storage medium 808. The storage medium 808 may be partitioned or otherwise divided such that predefined amounts of the storage medium 808 are devoted to storage of omnibus channel files, user-selected television programs and recorded advertisements.

The EPG database 810 may store information related to television channels and the timing of programs appearing on such television channels. The EPG database 810 may be stored using the storage medium 808, which may be a hard drive. Information from the EPG database 810 may be used to inform users of what television channels or programs are popular and/or provide recommendations to the user. Information from the EPG database 810 may provide the user with a visual interface displayed by a television that allows a user to browse and select television channels and/or television programs for viewing and/or recording. Information used to populate the EPG database 810 may be received via the network interface 806 and/or via satellites, such as satellites 206*a-c* of FIG. 2 via the tuners 804*a-c*. For instance, updates to the EPG database 810 may be received periodically via satellite. The EPG database 810 may serve as an interface for a user to control DVR functions of the television receiver 800, and/or to enable viewing and/or recording of multiple television channels simultaneously.

In addition to being used to provide users with information about scheduled programming, information from the EPG database 810 may be used to determine when television programs begin and end for the purposes of recording. For instance, when a channel-specific file is recorded that contains multiple television channels, the start and end of time of specific television programs within the channel-specific file may be based on the start and end times indicated in the EPG database 810. Other data may be stored within the EPG database 810 that may be useful in managing channel-specific files, such as series identifiers and episode identifiers, which may be used by a service provider to identify particular television programs. Flags may also indicate start and stop times of advertisement segments within a recordings.

The decoder 828 may serve to convert encoded video and audio into a format suitable for output to a display device.

For instance, the decoder 828 may receive MPEG video and audio from the storage medium 808, or the descrambling engine 824, to be output to a television. MPEG video and audio from the storage medium 808 may have been recorded to the DVR database 816 as part of a previously-recorded television program. The decoder 828 may convert the MPEG video and audio into a format appropriate to be displayed by a television or other form of display device and audio into a format appropriate to be output from speakers, respectively.

The television interface 812 may serve to output a signal to a television, or another form of display device, in a proper format for display of video and playback of audio. As such, the television interface 812 may output one or more television channels, stored television programming from the storage medium 808, such as television programs from the DVR database 816 and/or information from the EPG database 810 for example, to a television for presentation.

The NIT 814 may store information used by the television receiver 800 to access various television channels. The NIT 814 may be stored using the storage medium 808. Information used to populate the NIT 814 may be received via satellite, or cable, via the tuners 804a-c and/or may be received via the network interface 806 from a service provider. As such, information present in the NIT 814 may be periodically updated. The MT 814 may be locally-stored by the television receiver 800 using the storage medium 808. Information that may be present in the NIT 814 may include, for example: television channel numbers, a satellite identifier, a frequency identifier, a transponder identifier, a content identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 814 may be divided into additional tables. For example, rather than the specific audio PIDs and video PIDs being present in the NIT 814, a channel identifier may be present within NIT 814 which may be used to look up the audio PIDs and video PIDs in another table, such as the PMT 826. For example, the PMT 826 may store information on audio PIDs and video PIDs for television channels that are transmitted on a transponder frequency.

Table 1 below provides a simplified example of the NIT 814 for several television channels. It should be understood that in other embodiments, many more television channels may be represented in the NIT 814. The NIT 814 may be at least periodically updated by a service provider. As such, television channels may be reassigned to different satellites and/or transponders, and the television receiver 800 may be able to handle this reassignment as long as the NIT 814 is updated.

TABLE 1

| Channel | Satellite | Transponder | ECM PID | PMT PID |
|---------|-----------|-------------|---------|---------|
| 4 | 1 | 2 | 27 | 1001 |
| 5 | 2 | 11 | 29 | 1002 |
| 7 | 2 | 3 | 31 | 1001 |
| 13 | 2 | 4 | 33 | 1004 |

Based on information in the NIT 814, it may be possible to determine the proper satellite and transponder to which to tune for a particular television channel. In some embodiments, the NIT 814 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 814. Additional information on how the NIT 814, as indicated in Table 1, may be used is provided in reference to FIG. 4. The same PID may be reused on different transponders.

A digital video recorder (DVR) may permit a television channel to be recorded for a period of time. DVR functionality of the television receiver 800 may be managed by the control processor 802b. The control processor 802b may coordinate the television channel, start time, and stop time of when recording of a television channel is to occur. The DVR database 816 may store information related to the recording of television stations. The DVR database 816 may store timers that are used by the control processor 802b to determine when a television channel should be tuned to and its programs recorded to the DVR database 816. However, other embodiments are possible. For example, in some embodiments, the storage medium 808 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 808 may be devoted to the DVR database 816. Timers may be set by a service provider and/or one or more users of the television receiver 800.

DVR functionality of the control processor 802b may have multiple modes. For example, DVR functionality of the control processor 802b may be configured to record individual television programs selected by a user to the DVR database 816. Using the EPG database 810, a user may select a particular television program. Based on the date, time period, and television channel indicated by the EPG database 810, the control processor 802b may record the associated television program to the DVR database 816. In another example, the DVR database 816 may be used to store recordings of predefined periods of time on one or more television channels. These predefined periods of time may include one or more television programs. For example, Primetime on a particular television network may be recorded each weekday night. Further, multiple television channels may be recorded for such predefined periods of time. Such recording of television channels for predefined periods of time may be defined by a service provider (e.g., service provider 202).

As an example of this second mode of DVR functionality, a service provider may configure the television receiver 800 to record television programming on multiple, predefined television channels for a predefined period of time, on predefined dates. For instance, a service provider may configure the television receiver 800 such that television programming may be recorded from 7 PM to 10 PM on the NBC, ABC, CBS, and FOX networks each weeknight. When a television program is selected for recording by a user and is also specified for recording by the service provider, the user selection may serve as an indication to save the television program for an extended time, beyond the time which the predefined recording would otherwise be saved.

Whether recording is performed based on a user-selected television program or selection by a service provider, selection may result in storage by DVR database 816 being managed differently. Separate storage arrangements, such as separate partitions on the same storage device, may be allocated based on which entity designated the television program/channel for recording. As such, the DVR database 816 may use multiple storage arrangements, such as multiple partitions on the storage medium 808. Television programming recorded based on a service provider selection may be stored on a first storage arrangement. Television programming recorded based on user selection may be stored on a second storage arrangement. Television programming on the first storage arrangement may automatically be deleted after a predefined period of time, such as two weeks. If a television program stored by the first storage arrangement is selected by a user (such as via a displayed EPG) to be saved, the television program may be transferred from the first storage arrangement to the second storage arrangement, such as when the television programming would otherwise be deleted from the first storage arrangement.

The user interface 818 may include a remote control, physically separate from television receiver 800, and/or one or more buttons on the television receiver 800 that allows a user to interact with the television receiver 800. The user interface 818 may be used to select a television channel for viewing, view information from the EPG database 810, and/or program a timer stored to the DVR database 816 wherein the timer may be used to control the DVR functionality of the control processor 802*b*.

A DVR may also permit advertisements or other non-programming content to be recorded for a period of time. The control processor 802*b* may coordinate the start time and stop time when recording of an advertisement or other content stream. The Ad database 817 may store information related to the recording of advertisements. The Ad database 817 may store timers that are used by the control processor 802*b* to determine when a content stream including advertisements should be tuned to and the content stream recorded to the Ad database 817. Further, a limited amount of the storage medium 808 may be devoted to the Ad database 817. Optionally, information about each advertisement stored may be included within Ad database 817. For example, a duration of the advertisement, one or more advertisement identifiers, a content identifier, such as useful for associating the advertisement with a viewer attribute or a viewer's mental or biological characteristic, etc.

As described above, various versions of an advertisement for a particular product or service may be created. Optionally, Ad database 817 receives and stores, in conjunction with storage medium 808, multiple versions of advertisements for a single product or service and one of the multiple versions of the advertisements may be selected, such as depending on a viewer attribute and/or viewer's mental or biological characteristics, and played back for a viewer during an advertising segment/commercial break of a recorded or live program being watched by the viewer. In other embodiments, the advertisement is received in real-time for presentation to the viewer during live viewing of a television program, such as by switching video streams displayed on the display device on the fly. Optionally, during playback of a DVR recording, advertisements are inserted on the fly during commercial breaks in the recorded programs according to a mental characteristic of a viewer, such as described above. In embodiments, the advertisements shown to the viewer may be different from the advertisements included in the DVR recording.

Optionally, a service provider may configure the television receiver 800 to record various content streams, such as predefined television channels including advertisements, for a predefined period of time and/or on predefined dates. For instance, a service provider may configure the television receiver 800 such that advertisement streams may be recorded from 2 AM to 4 AM each night or at other times when the likelihood of program viewing by a viewer is low or when one or more tuners of 804*a-c* the television receiver 800 is idle.

Referring back to tuners 804*a-c*, television channels received via satellite, or cable, may contain at least some scrambled data. Packets of audio and video may be scrambled to prevent unauthorized users, such as nonsubscribers, from receiving television programming without paying the television service provider. When one of the tuners 804*a-c* is receiving data from a particular transponder of a satellite, the transponder stream may be a series of data packets corresponding to multiple television channels. Each data packet may contain a PID, which, in combination with the NIT 814 and/or the PMT 826, can be determined to be associated with particular television channel. Particular data packets, referred to as Entitlement Control Messages (ECMs) may be periodically transmitted. ECMs may be associated with another PID and may be encrypted; the television receiver 800 may use the smart card 822 to decrypt ECMs. Decryption of an ECM may only be possible when the user (e.g., television receiver 800) has authorization to access the particular television channel associated with the ECM. When an ECM is determined to correspond to a television channel being stored and/or displayed, the ECM may be provided to the smart card 822 for decryption.

When the smart card 822 receives an encrypted ECM, the smart card 822 may decrypt the ECM to obtain some number of control words. In some embodiments, from each ECM received by the smart card 822, two control words are obtained. In some embodiments, when the smart card 822 receives an ECM, it compares the ECM to the previously received ECM. When the two ECMs match, the second ECM is not decrypted because the same control words would be obtained. In other embodiments, each ECM received by the smart card 822 is decrypted; however, when a second ECM matches a first ECM, the outputted control words will match; thus, effectively, the second ECM does not affect the control words output by the smart card 822. The smart card 822 may be permanently part of the television receiver 800 or may be configured to be inserted and removed from television receiver 800.

The central processor 802*a* may be in communication with the tuners 804*a-c* and the control processor 802*b*. The central processor 802*a* may be configured to receive commands from the control processor 802*b*. Such commands may indicate when to start/stop recording a television channel and/or when to start/stop causing a television channel to be output to a television. The central processor 802*a* may control the tuners 804*a-c*. The central processor 802*a* may provide commands to the tuners 804*a-c* that instruct the tuners which satellite, transponder, and/or frequency to tune to. From the tuners 804*a-c*, the central processor 802*a* may receive transponder streams of packetized data. As previously detailed, some or all of these packets may include a PID that identifies the content of the packet.

The central processor 802*a* may be configured to create at least one PID filter 820 that sorts packets received from the tuners 804*a-c* based on the PIDs. When a tuner is initially tuned to a particular frequency, such as a particular transponder of a satellite, a PID filter may be created based on a PID of PMT data. The PID of PMT data packets may be known because it is stored as part of the NIT 814. From the PMT data packets, the PMT 826 may be constructed by central processor 802a. Table 2, below, provides an exemplary snapshot of a PMT. The PMT 826 may be specific to a particular transponder. As such, when tuning to a different transponder occurs, a new PMT may be created for the different transponder.

TABLE 2

| Channel | Video PID | 1$^{st}$ Audio PID | 2$^{nd}$ Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in the PMT 826, the audio and video PIDs for specific television channels may be identified. A television channel may have multiple audio PIDs due to a second audio program, which may be in a different language. It should be understood that the values provided in Table 2 are for example purposes only. Actual values may vary. Additional information or less information may also be stored in the PMT 826.

The PID filter 820 may be configured to filter data packets based on PIDs. In some embodiments, the PID filter 820 is created and executed by central processor 802a. In other embodiments, separate hardware may be used to create and execute multiple PID filters. Depending on a television channel selected for recording/viewing, a PID filter may be created to filter the video and audio packets associated with the television channel, based on the PID assignments present in the PMT 826. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 824 or the smart card 822; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 814, may be appropriately routed by the PID filter 820. At a given time, one or multiple PID filters may be executed by the central processor 802a.

The descrambling engine 824 may use the control words output by the smart card 822 in order to descramble video and/or audio corresponding to television channels for storage and/or presentation. Video and/or audio data contained in the transponder data stream received by the tuners 804a-c may be scrambled. Video and/or audio data may be descrambled by descrambling engine 824 using a particular control word. Which control word output by the smart card 822 to be used for successful descrambling may be indicated by a scramble control identifier present within the data packet containing the scrambled video or audio. Descrambled video and/or audio may be output by the descrambling engine 824 to the storage medium 808 for storage in the DVR database 816 and/or to the decoder 828 for output to a television or other presentation equipment via the television interface 812.

For simplicity, the television receiver 800 of FIG. 8 has been reduced to a block diagram; commonly known parts, such as a power supply, have been omitted. Further, some routing between the various modules of television receiver 800 has been illustrated. Such illustrations are for exemplary purposes only. The state of two modules not being directly or indirectly connected does not indicate the modules cannot communicate. Rather, connections between modules of the television receiver 800 are intended only to indicate possible common data routing. It should be understood that the modules of the television receiver 800 may be combined into a fewer number of modules or divided into a greater number of modules. Further, the components of the television receiver 800 may be part of another device, such as built into a television. Also, while the television receiver 800 may be used to receive, store, and present television channels and advertisements received via a satellite, it should be understood that similar components may be used to receive, store, and present television channels via a cable network.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television receiver comprising:
   one or more processors; and
   a non-transitory computer readable storage medium communicatively coupled with and readable by the one or more processors and having stored therein processor-readable instructions that, when executed by the one or more processors, cause the one or more processors to perform operations including:
   receiving a plurality of content streams via a television network, wherein a first content stream includes video content and an ads referencing (AR) content identifier, the video content comprising a primary television program having a plurality of program segments separated by commercial breaks, and the AR content identifier indicating, for at least one of the commercial breaks, a plurality of hard coded content streams, each comprising a respective advertisement associated with a respective one of a plurality of stress levels;
   generating an output signal for displaying the video content of the first content stream;
   during the displaying of one of the plurality of program segments of the video content of the first content stream that precedes the at least one of the commercial breaks:
   receiving data from one or more biosensors;
   analyzing the data to determine viewer attribute information that characterizes a stress level of a viewer; and
   determining one of the plurality of hard coded content streams as associated with the respective one of the plurality of stress levels corresponding to the characterized stress level of the viewer in accordance with the AR content identifier;
   identifying a second content stream as the one of the plurality of hard coded content streams; and
   switching the output signal for displaying the second content stream during the at least one of the commercial breaks.

2. The television receiver of claim 1, wherein the operations further include:
   identifying updated viewer attribute information, wherein the updated viewer attribute information characterizes an updated mental characteristic of the viewer;
   identifying a third content stream, wherein identifying includes using the updated viewer attribute information;
   receiving the third content stream; and
   generating a third output signal for displaying the third content stream.

3. The television receiver of claim 1, wherein identifying the second content stream includes comparing the viewer attribute information with content attributes for one or more content streams, and wherein identifying the second content stream includes selecting the second content stream based on the comparison.

4. The television receiver of claim 1, wherein the viewer attribute information further characterizes a biological characteristic of the viewer, and wherein identifying the second content stream includes using the stress level and the biological characteristic.

5. A computer implemented method, comprising:
   receiving, at a television receiver including one or more processors via a television network, a plurality of content streams, wherein a first content stream includes video content and an ads referencing (AR) content identifier, the video content comprising a primary television program having a plurality of program segments separated by commercial breaks, and the AR content identifier indicating, for at least one of the commercial breaks, a plurality of hard coded content streams, each comprising a respective advertisement associated with a respective one of a plurality of stress levels;
   generating an output signal for displaying the video content of the first content stream;
   during the displaying of one of the plurality of program segments of the video content of the first content stream that precedes the at least one of the commercial breaks:
   receiving data from one or more biosensors;
   analyzing the data to determine viewer attribute information that characterizes a stress level of a viewer; and
   determining one of the plurality of hard coded content streams as associated with the respective one of the plurality of stress levels corresponding to the characterized stress level of the viewer in accordance with the AR content identifier;
   identifying a second content stream as the one of the plurality of hard coded content streams; and
   switching the output signal for displaying the second content stream during the at least one of the commercial breaks.

6. The method of claim 5, further comprising:
   identifying updated viewer attribute information, wherein the updated viewer attribute information characterizes an updated mental characteristic of the viewer;
   identifying a third content stream, wherein identifying includes using the updated viewer attribute information;
   receiving the third content stream; and
   generating a third output signal for displaying the third content stream.

7. The method of claim 5, wherein identifying the second content stream includes comparing the viewer attribute information with content attributes for one or more content streams and wherein identifying the second content stream includes selecting the second content stream based on the comparison.

8. The method of claim 5, wherein the viewer attribute information further characterizes a biological characteristic of the viewer, and wherein identifying the second content stream includes using the stress level and the biological characteristic.

9. A non-transitory processor-readable medium for contextual advertising, the medium comprising processor-readable instructions configured to cause one or more processors to perform operations including:
   receiving a plurality of content streams via a television network, wherein a first content stream includes video content and an ads referencing (AR) content identifier, the video content comprising a primary television program having a plurality of program segments separated by commercial breaks, and the AR content identifier indicating, for at least one of the commercial breaks, a plurality of hard coded content streams, each comprising a respective advertisement associated with a respective one of a plurality of stress levels;
   generating an first output signal for displaying the video content of the first content stream;

during the displaying of one of the plurality of program segments of the video content of the first content stream that precedes the at least one of the commercial breaks:
receiving data from one or more biosensors;
analyzing the data to determine viewer attribute information that characterizes a stress level of a viewer; and
determining one of the plurality of hard coded content streams as associated with the respective one of the plurality of stress levels corresponding to the characterized stress level of the viewer in accordance with the AR content identifier;
identifying a second content stream as the one of the plurality of hard coded content streams; and
switching the output signal for displaying the second content stream during the at least one of the commercial breaks.

10. The non-transitory processor-readable medium of claim 9, further comprising processor-readable instructions configured to cause the one or more processors to perform operations including:
identifying updated viewer attribute information, wherein the updated viewer attribute information characterizes an updated mental characteristic of the viewer;
identifying a third content stream, wherein identifying includes using the updated viewer attribute information;
receiving the third content stream; and
generating a third output signal for displaying the third content stream.

11. The non-transitory processor-readable medium of claim 9, wherein identifying the second content stream includes comparing the viewer attribute information with content attributes for one or more content streams, and wherein identifying the second content stream includes selecting the second content stream based on the comparison.

12. The non-transitory processor-readable medium of claim 9, wherein the viewer attribute information further characterizes a biological characteristic of the viewer, and wherein identifying the second content stream includes using the stress level and the biological characteristic.

* * * * *